United States Patent [19]
Schindler et al.

[11] Patent Number: 5,748,286
[45] Date of Patent: May 5, 1998

[54] METHOD AND APPARATUS FOR PRINTING PHOTOGRAPHS OF DIFFERENT FORMATS

[75] Inventors: Hans-Georg Schindler, Holzkirchen; Hans-Jurgen Rauh, Strasslach-Dingh; Manfred Fursich, Taufkirchen; Magos Vasilios, Unterhaching; Wilhelm Nitsch; Rainer Deutsch, both of München; Klaus-P. Hartmann, Schondorf; Leonhard Huber, Glonn; Gerhard Benker, Icking; Reimund Münch, München, all of Germany

[73] Assignee: Agfa-Gevaert Aktiengesellschaft, Leverkusen, Germany

[21] Appl. No.: 444,913

[22] Filed: May 18, 1995

[30] Foreign Application Priority Data

May 27, 1994 [DE] Germany ............... 44 18 602.9

[51] Int. Cl.[6] ................. G03B 27/52; G03B 27/44
[52] U.S. Cl. ............. 355/40; 355/41; 355/42; 355/43; 355/54; 355/77

[58] Field of Search ............... 355/22, 40–43, 355/54, 77, 39

[56] References Cited

U.S. PATENT DOCUMENTS 5,400,117   3/1995   Fetterman et al. .............. 355/75

Primary Examiner—R. L. Moses
Assistant Examiner—Shival Virmani
Attorney, Agent, or Firm—Furgang & Milde, LLP

[57] ABSTRACT

A method and apparatus for producing prints of different formats from negatives in the form of strips. The negative images are printed in one reproduction scale on one section of a strip of stock during a first pass of the strip through the printing mechanism, the printing mechanism is readjusted, and the negative images are then printed in another, different scale on a subsequent section of the strip of stock during another pass of the strip through the printing mechanism.

14 Claims, 4 Drawing Sheets

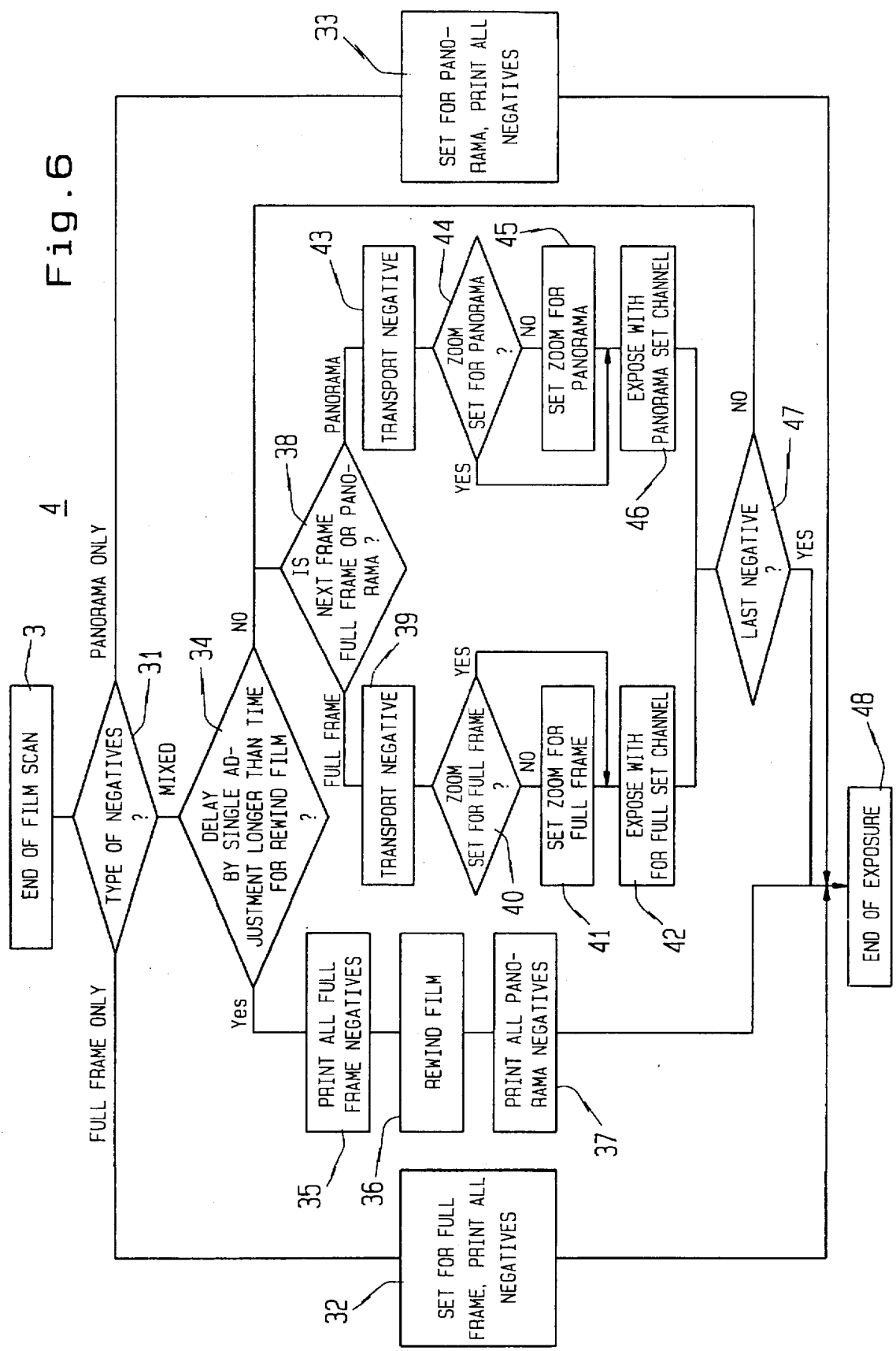

METHOD AND APPARATUS FOR PRINTING PHOTOGRAPHS OF DIFFERENT FORMATS

BACKGROUND OF THE INVENTION

The present invention concerns a method and apparatus for printing photographs of different formats.

Cameras that can produce what are called "panoramic images" have recently been introduced on the market. Panoramic images are produced on an ordinary 35 mm film (standard 135 film) with some of the top and bottom edges masked to vary the ratio of width to height without actually varying the width itself. The negatives are usually printed enlarged to the full height of the paper. The paper must of course be long enough to accommodate the whole image. This procedure results in pictures of conventional height, although definitely wider; i.e., panoramic images. Composite panoramas and conventional-format pictures can also be obtained with the same special cameras, depending upon the subject. It would accordingly be desirable to print photographs of different size and format on the same strip of paper from the same strip of film, one directly after another. Automatically sensing the dimensions of each image in a roll-fed printer and adjusting the size and format of each print thereto has accordingly been suggested. A zoom lens is accordingly set for the particular size and masks are positioned in the positive stage to establish the width of the image. Since, however, such mechanical adjustments take time to carry out, the printer's output can be considerably reduced when there are many variations in format along the same film that necessitate readjusting the equipment.

Another type of photograph that has recently become popular is what is called an "index print". An index print is a sheet of adjacent rows and columns of highly reduced images similar to the former "contact prints". Such a sheet can accommodate 9, 16, or 25 images. Index prints are difficult to produce, even from the administrative point of view, when they are generated on a separate printer using a digital imaging process. Photographic printers suitable for making index prints are disclosed in the U.S. Pat. Nos. 4,933,773 and 5,184,277.

SUMMARY OF THE INVENTION

A principal object of the present invention is to simplify printing photographs from a single strip of negatives of different format.

A further object of the present invention is to simplify the production of "index prints".

These objects, as well as other objects which will become apparent in the discussion that follows, are attained, in accordance with the present invention by a method wherein the negative images in one scale are printed on one section of a strip of stock during a first pass of the film strip through the printing mechanism, whereupon the printing mechanism is readjusted and the negative images in another scale are printed on a subsequent section of the strip of stock during another pass of the film strip through the printing mechanism.

The strips of film are thus passed through the printer twice in succession, and there is only one adjustment for each pass of the strip. All the images that extend the full height of the strip are printed during the first pass, for example, and the panoramic images—the images that are not as high as the width of the strip—are ignored. The second pass can either be initiated immediately and in the opposite direction due to information that some images have been ignored because of their panoramic dimension, when the adhesive tape is encountered at the end of the film strip, or the film strip can be rewound until the adhesive tape at the beginning of the strip is encountered, while the lens and paper-advance mechanism are being readjusted, and the second pass commenced in the same direction. The strip can then be passed through the equipment again to print the panoramic images. If there are enough panoramic images to justify the procedure, immediate readjustment can be avoided by testing the next strip to enter the printer to determine how many panoramic images it contains, and then printing them first before converting back to conventional format.

For a full understanding of the present invention, reference should now be made to the following detailed description of the preferred embodiments of the invention as illustrated in the accompanying drawings.

BRIEF DESCRIPTION OF THE DRAWINGS

FIG. 6 is a flow chart illustrating the operation of the printer of FIG. 1.

DESCRIPTION OF THE PREFERRED EMBODIMENTS

Figure 1:
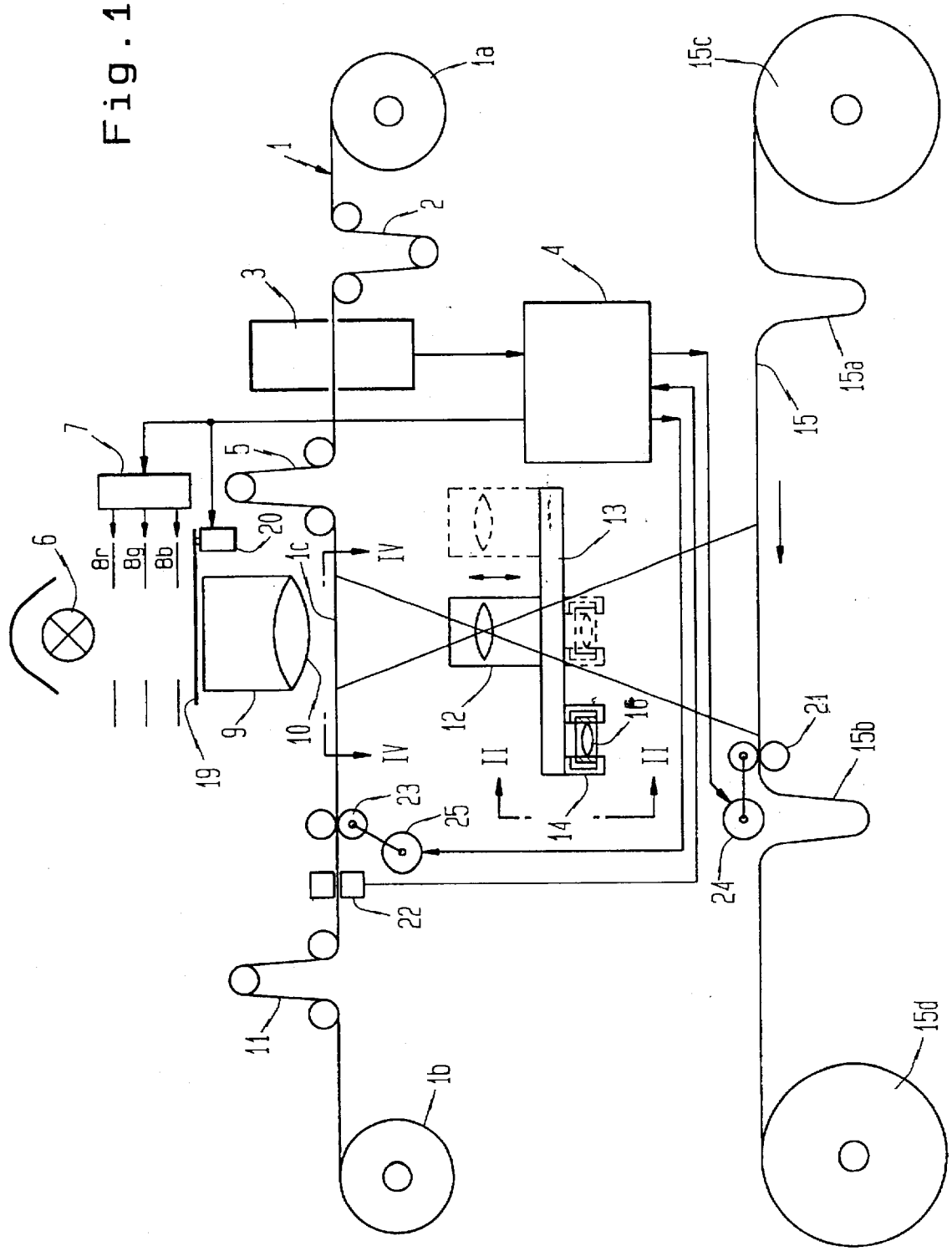
FIG. 1 is a schematic diagram of a printer in which strips of film pass through more than once.

The preferred embodiments of the present invention will now be described with reference to FIGS. 1–6 of the drawings. Identical elements in the various figures are designated with the same reference numerals.

FIG. 1 is a schematic diagram of a photographic printer. Individual strips of film are attached end to end into a continuous strip 1 wound onto a reel 1a. Continuous strip 1 is supplied through a slack take-up device 2 and travels discontinuously through the printer from right to left, as shown in the Figure. After leaving the printer, the strip is wound up on another reel 1b. In traveling through the printer the continuous strip 1 initially encounters a conventional scanner 3 with a row of diodes for each primary color. The scanner 3 scans the strip for the primary colors at each point and supplies the results to an exposure control unit 4. The computer 4 processes the results obtained from a large number of negative images, in particular for the whole film strip, in the manner disclosed in the German Patent No. 2,840,287 and its corresponding U.S. Pat. No. 4,279,502, and constructs density-difference curves. Light quantities in the three primary colors are then calculated for each individual negative in accordance with its density specific color error from the density difference curves. The strip next arrives at a printing mechanism after traveling through a detour take-up device 5 that delays it long enough for the results from all the negative images to be processed. The printing mechanism comprises, from top to bottom, a source of light 6 with a reflector; a filter assembly 7, 8; a shutter 19; a blending shaft 9; a condensing lens 10; and an objective lens 12. The shutter 19 is driven by an electromagnet 20 in response to the exposure control computer 4. The light emitted by the source 6 is concentrated by the reflector and shines down through the filter assembly 7 and 8, past the open shutter 19, through blending shaft 9 and condensing lens 10, through the negative, and through the objective lens 12 and arrives in the form of an image on light-sensitive printing stock 15. The objective lens 12 is a motorized zoom lens which can project full-format images from films of different width onto stock of one width and images from films of one width onto stock of different widths. In other words, the objective zoom lens 12 is capable of changing the scale of the images projected onto the printing stock.

The filter assembly 7 comprises a stack of maximal-absorption red, green and blue filters 8r, 8g, and 8b, respectively, that can be inserted into the beam of light to an extent dictated by the exposure control computer 4 until the color of the light yields a color-neutral reproduction ideal for the areas of the negative that are significant for the subject. The total light quantity is then controlled by means of the shutter 19 and electromagnet 20 in response to the exposure control computer 4.

Downstream of the printing mechanism is an adhesive tape sensor 22. When one of the joints between two adjacent individual strips of film travels past the sensor 22, the sensor sends a signal to the exposure control computer 4. The film then travels through another slack take-up device 11 and is wound onto a reel 1b.

Raw printing stock 15 arrives horizontally from right to left from a reel 15c to the right of the printing mechanism. The stock travels initially through a loop 15a, over a printing surface below the objective lens 12, through a stock-advance mechanism 21, through another loop 15b, and onto another reel 15d.

Some of the significant components of the apparatus will now be further specified.

Figure 2:
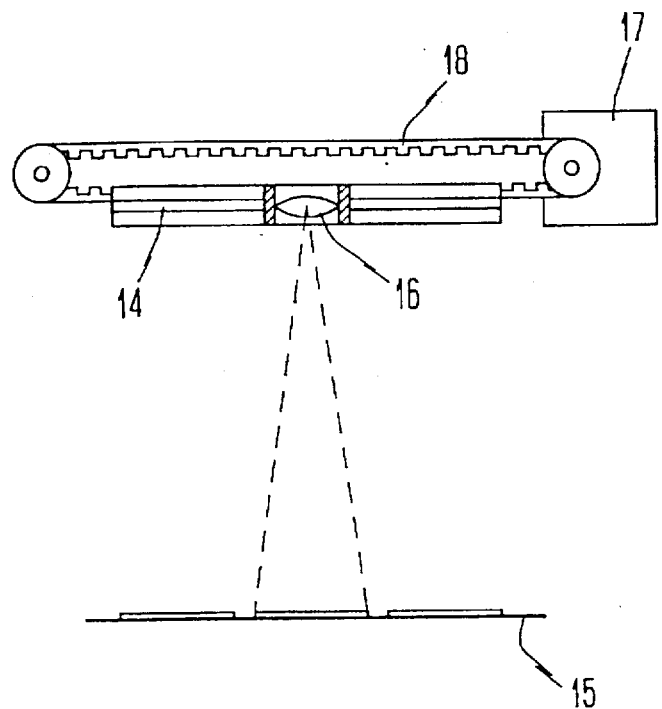
FIG. 2 is a section through part of the printer illustrated in FIG. 1, taken along the line II—II, showing apparatus for producing index prints.

The objective zoom lens 12 does not remain permanently in the path of the beam but can be displaced to the right along a track 13 by means of transport device (not shown) into the position illustrated by the broken lines. With the printer in the state illustrated in FIG. 1, there is a transverse track 14 at the left of track 13. Another objective lens 16 replaces the zoom lens 12, when the latter is moved to the right, and shuttles back and forth across the stock 15 on the transverse track 14 as illustrated in FIG. 2. The objective lens 16 is moved in position by a stepping motor 17 and a cogged belt 18.

Figure 3:
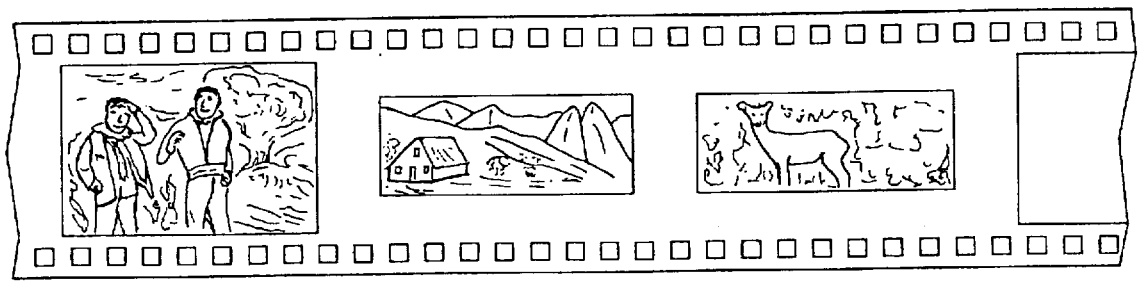
FIG. 3 illustrates a strip of film bearing both conventional and panoramic images.

The aforesaid printer can print various types of photographs onto a single strip of stock from strips of negative film with no significant sacrifice of speed. The types of photographs include both conventional and panoramic photographs as illustrated in FIG. 3. Once the initial adhesive tape has been detected, the total length and width of the strip of film is scanned point by point by the scanner 3. The scanning results are employed in the computer 4, as disclosed in the German Patent No. 2,840,287, to determine the ideal light quantity in each primary color for each negative. The scanner also detects the upstream and downstream edges of each image, which are essential for positioning the film in the printer unless the film has already been notched for that purpose. The same results are also processed in the following manner to determine whether the image is of conventional format or panoramic format.

Panoramic images are not exposed outside the image field, as shown with respect to the middle and right hand complete images illustrated in FIG. 3, and the film is accordingly completely transparent in these areas. The density-measurement signals obtained area by area to determine the light quantities are accordingly analyzed to determine whether the results in the areas along the longitudinal borders of the negative exceed the density of the mask by no more than an amount corresponding (more or less) to noise, and whether the results in a central area corresponding to the area of the panorama definitely exceed the mask value, or the density values from the central area exceed the border values by a prescribed minimum. Such negatives are accordingly interpreted as panoramic images and are printed.

Also, when the edge areas of an image that is darkened or colored only in the central portion (inside the normal image width for panoramic images) of the film are completely transparent, this information is passed by the scanner 3 to the computer 4 and the computer assumes that the image is panoramic. Once the film has been entirely scanned by the scanner 3, accordingly, the positions where full-format and panoramic images are present will be known.

If, for example, the printing mechanism is set for full format, meaning that the height of the conventional image extends over the total width of the stock, and if the mechanism 21 advances the stock in increments that equal the normal width of a full-format image, the full-format images will be correctly positioned for printing and will be printed. Once the sensor 22 detects the adhesive tape at the end of the individual film strip, the strip will be entirely retracted past the printing mechanism, while the latter is converted for panoramic printing. In particular, the lens motor modifies the field of objective lens 12 until the height of the shallower panoramic image extends precisely over the total width of the printing stock, and the travel increment of the printing stock is adjusted for the panoramic image. The panoramic images are then printed in a second pass at the appropriate settings. The same setting can be retained for the next film if an intermediate scan determines that panoramic images are still present. The full format images on the film are thereafter printed during the second pass. The printing can also occur immediately during the first pass instead of during the second forward pass, and the next forward pass can be employed for a third type of negative. The difference between the format of the panorama negative and that of the normal 35-mm negative necessitates further adjustments for the sake of quality. On the one hand, there is a risk that light passed through the unexposed upper and lower border areas in panoramic photographs may arrive in the vicinity of the objective lens. This light will eventually act in the capacity of scatter on the printing material resulting in a loss of brilliance. On the other hand, the larger projection scale required for panorama negatives demands a wider objective aperture in order to maintain acceptable printing times and, because of the larger projection scale alone, a more satisfactory planar position for the film than for a normal 35-mm image. A special negative support is accordingly necessary, which must also be easy to readjust.

Figure 5:
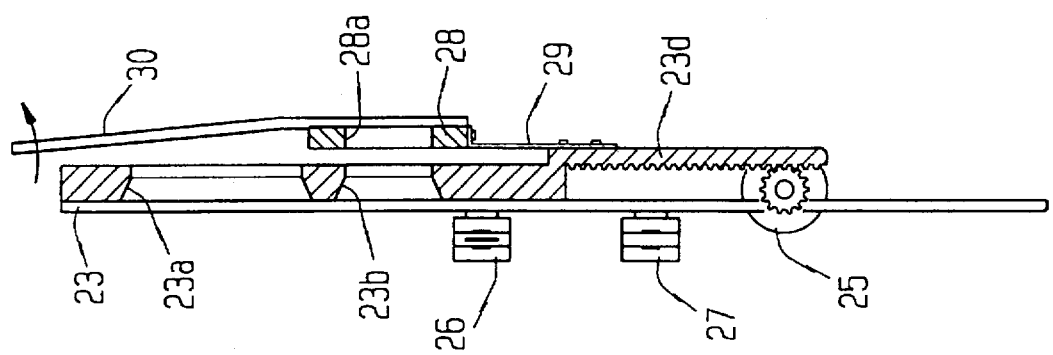
FIG. 5 is a cross-sectional side view of the negative support of FIG. 4, taken along the line V—V in FIG. 4.
Figure 4:
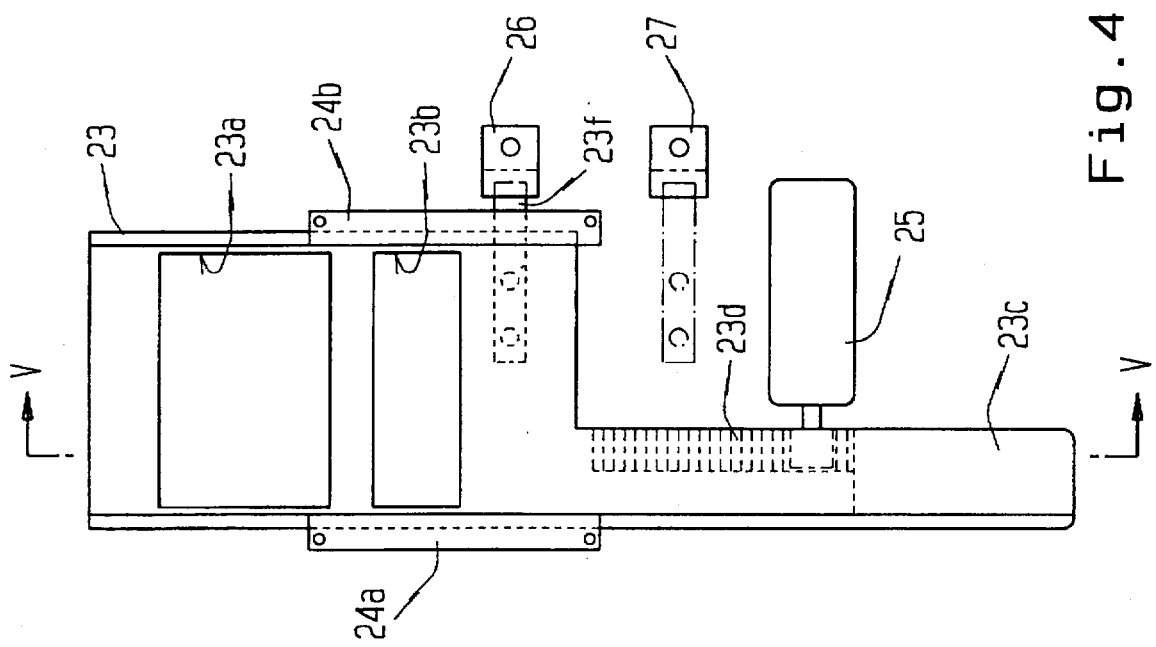
FIG. 4 is a view of the negative support in the printer of FIG. 1, taken in the direction of arrows IV—IV in FIG. 1.

Details of such a negative support are illustrated in FIGS. 4 and 5. A slide 23 travels back and forth, transverse to the direction the film advances and in the same plane as the negative support. Slide 23 travels on rails 24a and 24b. The slide has at the top, as illustrated in FIG. 4, an aperture 23a matching the full 35-mm format and beneath it, precisely in the printing position, an aperture 23b approximately half as high for the panorama negatives. Mounted on a very long projection 23c for the purpose of stabilization is a rack 23d that engages the pinion of a motor 25. Motor 25 displaces the slide 23 down and out of the illustrated location, with the aperture 23b in the printing position, until the aperture 23a arrives in the printing position. The particular position of the slide is indicated by a flag 23f that constantly enters the gap in a light barrier 26 or 27. Mounted on a leaf spring 29 on a rack 23d is a negative-flattening frame 28, illustrated only in FIG. 5. The aperture 28a in frame 28 matches the aperture 23b in size and shape. A spring 29 maintains the frame 28 slightly elevated and, while it is being advanced, the film does not come into contact with the lower surface of frame 28, which prevents scratching. Frame 28, however, engages matching tracks in a plate 30 that is at any rate provided outside of its periphery for flattening full-format negatives. When plate 30 is forced down, as is conventional upon completion of a film-advance procedure, it entrains the frame 28, which is in its activated state illustrated in FIG. 5, and forces it down around the window 28a and tightly against the border of the mask 23b, so that the film can be maintained flat in the window with considerable precision.

It will now be apparent how this equipment operates. To print panoramas, the motor 25 displaces the slide 23 into the position illustrated in FIG. 4. A feedback signal is emitted from a light barrier 26. If regular format negatives are to be printed from, the motor 25 displaces the slide 23 down into a position (not illustrated in FIG. 4) wherein the window 23a is in the printing position. During the associated retraction of the mask aperture 23b, the frame 28 is also retracted from the exposure position, so that a flattening plate 30 will flatten a regular-format negative against the borders of the mask aperture 23a along at least three slides. Such stabilization is adequate for maintaining a regular-format negative flat.

The particular mode of operation will now depend on the number and distribution of the full-format and panorama negatives on one strip of film, ensuring the most efficient printing procedure possible. The automatic sequence of such optimized controls is illustrated by the flow chart in FIG. 6. Once the scanner 3 illustrated in FIG. 11 has completed the scanning process, all data relating to the densities significant to the calculation of printing-light quantities and to the type of negative will have been scanned and processed in the computer 4. The first stage in the decision process, stage 31, can accordingly have three different results. On the one hand, all the negatives will have a full frame small image format, in which event the film support and the scale of enlargement and image length will be adjusted for the small image as represented in box 32, and all the negatives will be printed from at once. The second possibility is that all the negatives are panoramas. In this event the negative support, scale of reproduction, paper-advance increment and mask aperture will be adjusted as represented in box 33 and the prints will be exposed accordingly.

The most time consuming possibility occurs when panorama and normal formats exist together on the same strip. Information as to the number and sequence of the various negatives is known from the processing of density values in computer 4, and an optimization can be carried out that compares (1) the time required for rewinding the whole film with a simultaneous readjustment of the printing mechanism with (2) the additional time needed to readjust the printing mechanism when the negative format must be changed within a single film. If the analysis represented in stage 34 reveals that the format changes often and that two passes will be more efficient, all the negatives of one format will be printed from in succession, skipping those of the other format, with the existing adjustment as represented by box 35. The film will then be rewound (box 36), the degree of enlargement, image length, and mask readjusted, and in a second pass the previously skipped images are printed onto the adjacent area of the printing material.

If, on the other hand, the analysis conducted at stage 34 reveals that only a few readjustments will be necessary and that they will take less time than the time needed for rewinding, a decision is made at stage 38 every time a new negative enters as to whether the equipment configuration is appropriate and, if not, the equipment is readjusted. This occurs as represented by boxes 39 to 42 with full format images and by boxes 43 to 46 with panorama negatives. The procedure at decision state 38 is repeated up to the last negative on a film as represented at stage 47, and the analysis at step 31 is repeated each time a new roll of film is sensed.

These steps as illustrated in FIGS. 1 and 6 can be repeated not only when strips (rolls) of film are attached end to end to make a long strip. They are also possible with single rolls, in a minilab, for example, in which event all the results are known before the first printing procedure, so that the analysis of negative formats can be carried out before printing begins.

Such a printer can also be employed to produce what are called index prints. Index prints are prints of rows and columns of greatly reduced images of all the negatives in a film that make it possible to select images for final printing.

If index prints are to be produced from a film instead of or in addition to panoramic prints, they are produced in a separate pass. The objective lens 12 is displaced to the right and into the position represented by the broken line while objective lens 16 is displaced along with its track 14 and the drive mechanism 17, 18 into its operative position in the path of the beam. Motor 17 now positions the objective lens 16 outside, where the negative 1c at the printing mechanism is projected precisely at the left edge of the stock. Stock-advance mechanism 21 has already been set during the preceding printing procedure to ensure that the upstream edge of the printed image is precisely adjacent to the index-print row that is now to be printed. The film's negatives are now positioned successively at the printing mechanism, the already established associated ideal printing data are converted into filter positions and shutter speeds by exposure controls 4, and the objective lens 16 is advanced one increment farther along transverse track 14 with the negative transport. Once one row has been printed, the objective lens 16 is returned to its other limit, the stock 15 is advanced one increment of image width by the mechanism 21, and the next row of images is then printed. When the sensor 22 detects the adhesive tape at the end of the individual strip, the printing procedure is complete and the next procedure can be initiated in accordance with the particular order, for index prints, panoramic prints, or conventional prints as desired.

This extraordinarily multifaceted roll-film printer can also be employed for other types of photographs, for example, when either double-width panoramic images that extend in height over the whole width of the film or half-format images are to be printed.

There has thus been shown and described a novel method and apparatus for printing photographs of different formats which fulfills all the objects and advantages sought therefor. Many changes, modifications, variations and other uses and applications of the subject invention will, however, become apparent to those skilled in the art after considering this specification and the accompanying drawings which disclose the preferred embodiment thereof. All such changes, modifications, variations and other uses and applications which do not depart from the spirit and scope of the invention are deemed to be covered by the invention, which is to be limited only by the claims which follow.

What is claimed is:

1. In a method of producing photographic prints in different photographic formats with different reproduction scales on a strip of printing stock from a series of negative images on a film strip, said method using a printing mechanism to focus light passed through the negative images onto the printing stock and using a negative image scanner which scans a plurality of image areas to determine the optical density at such areas for the purpose of establishing printing light quantities, said method producing panorama photographic prints from panorama negative images, which panorama negative images differ in image height from a regular negative image height on the film strip, said method comprising the steps of:

(a) scanning the negative images on the film strip to determine the optical densities of image areas therein;

(b) analyzing the density values obtained by the scanner to determine the negative image height, wherein panorama images are determined when (1) the density values associated with the areas along the longitudinal borders of a negative image do not exceed the density values of a mask by more than a prescribed minimum that can be ascribed to noise, and (2) at least one of (i) the density values associated with a central area of the image exceed the mask density values, and (ii) the density values from the central area exceed the longitudinal border values, by a prescribed minimum;

(c) printing negative images of a first format in one reproduction scale on one section of the strip of printing stock during a first pass of the film strip through the printing mechanism:

(d) automatically readjusting the printing mechanism to change the reproduction scale to that of a second format; and (e) printing negative images of the second format on a subsequent section of the strip of printing stock during another pass of the film strip through the printing mechanism.

2. The method defined in claim 1, wherein the printing mechanism includes a negative support for holding the negative image during light exposure, and wherein a motor introduces a mask with a window matching the image height into the light exposure path on the negative support, thereby to configure the printing mechanism for the respective image heights.

3. The method defined in claim 2, wherein the printing mechanism includes a negative-flattening frame that can be raised and lowered with respect to the mask against the side of the film facing the mask and a negative-flattening plate that can be raised to advance the film.

4. In a method of producing photographic prints in different photographic formats with different reproduction scales on a strip of printing stock from a series of negative images on a film strip, said method using a printing mechanism to focus light passed through the negative images onto the printing stock, the method comprising the steps of:

(a) scanning the film strip to determine the format of each photographic print;

(b) printing negative images in a first reproduction scale on one section of the strip of printing stock during a first pass of the film strip through the printing mechanism;

(c) automatically readjusting the printing mechanism to a second reproduction scale; and (d) printing negative images in the second scale on a subsequent section of the strip of printing stock during another pass of the film strip through the printing mechanism, the improvement wherein all the negative images on one strip of-film are analyzed for size prior to the first printing procedure and prints are printed from negative images of only one format, wherein the number and sequence of the negative images on films with negative images of different formats are identified and stored, and wherein the time needed to reconfigure the printing mechanism is compared to the time needed to rewind the film to decide which procedure would be more rapid and is accordingly to be employed.

5. In a method of producing photographic prints in different photographic formats with different reproduction scales on a strip of printing stock from a series of negative images on a film strip, said method using a printing mechanism to focus light passed through the negative images onto the printing stock, said method comprising the steps of: printing negative images in a first reproduction scale on one section of the strip of printing stock during a first pass of the film strip through the printing mechanism; automatically readjusting the printing mechanism to another reproduction scale; and printing index prints, which are much reduced prints arranged in rows and columns, on a subsequent section of the strip of printing stock from the same negative images during another pass of the film strip through the printing mechanism.

6. In apparatus for producing photographic prints in different photographic formats with different reproduction scales on a strip of printing stock from a series of negative images on a film strip, said apparatus comprising a negative support with an automatic film strip transport; a negative image scanner which scans a plurality of image areas to determine the optical density at such areas for the purpose of establishing printing light quantities, a controlled source of light for exposing the negative images in accordance with the density values obtained by the scanner; a printing stock strip guide with an automatic stock strip transport; and a printing mechanism for focusing the light passed through the negative images onto the printing stock; means for determining the format of each photographic print to be produced; means for readjusting the printing mechanism to change the reproduction scale in accordance with the current print format; and means for readjusting the negative support and the printing stock strip guide to move the film strip and to move the printing stock strip in accordance with the current print format of the photographic prints to be printed on the stock strip; the improvement wherein all negative frames on said film strip are initially scanned to obtain said density values and the print formats are determined prior to printing photographic prints from the negative images on said film strip.

7. The apparatus defined in claim 6, further comprising a panorama mask including a slide, with a window for each format size, that can be introduced into the printing position by a rack and pinion drive.

8. The apparatus defined in claim 7, wherein the panorama mask includes a moveable negative-flattening frame with an aperture matching the panorama format which is attached to the slide by a resilient articulation and, in the introduced state, engages a controlled negative-flattening plate flattening the film against the mask for the duration of an exposure.

9. The apparatus defined in claim 6, wherein the printing mechanism includes an enlarging lens which can be replaced by an objective lens for printing index prints, said objective lens being introduced by means of a guide that extends transverse to the direction the stock strip advances into positions that correspond to the position of the individual images of the index print in a printing plane.

10. The apparatus defined in claim 9, wherein the enlarging lens has an adjustable focal width.

11. The method defined in claim 5, wherein the printing mechanism includes a negative support for holding the negative image during light exposure, and wherein a motor introduces a mask with a window in the light exposure path on the negative support, thereby to configure the printing mechanism for the respective print formats.

12. The method defined in claim 11, wherein the printing mechanism includes a negative-flattening frame that can be raised and lowered with respect to the mask against the side of the film facing the mask and a negative-flattening plate that can be raised to advance the film.

13. The method defined in claim 5, using a negative image scanner which scans a plurality of image areas to determine the optical density at such areas for the purpose of establishing print light quantities, and a controlled source of light for exposing the negative images in accordance with the density values obtained by the scanner, wherein the density values used for printing said index prints are the same as the density values determined and used for printing negative images in said first format.

14. In a method of producing photographic prints in different photographic formats with different reproduction scales on a strip of printing stock from a series of negative images on a film strip, said method using a printing mechanism to focus light passed through the negative images onto the printing stock and using a negative image scanner which scans a plurality of image areas to determine the optical density at such areas for the purpose of establishing printing light quantities, said method producing panorama photographic prints from panorama negative images, which panorama negative images differ in image height from a regular negative image height on the film strip, said method comprising the steps of:

(a) scanning the negative images on the film strip to determine the optical densities of image areas therein;

(b) printing negative images of a first format in one reproduction scale on one section of the strip of printing stock during a first pass of the film strip through the printing mechanism; and (c) printing negative images of the second format on a subsequent section of the strip of printing stock during another pass of the film strip through the printing mechanism;

the improvement wherein the printing mechanism includes a negative support for holding the negative image during light exposure; wherein a motor introduces a mask with a window matching the panorama image height into the light exposure path on the negative support, thereby to configure the printing mechanism for the panorama image height; and wherein the printing mechanism includes a negative-flattening frame, having a window opening with substantially the same orientation, shape and size as that of the mask, which frame can be raised and lowered with respect to the mask against the side of the film which is opposite to the side facing the mask, thereby to retain the film against the mask while making panorama prints and to release the film during movement of the film strip from one negative image to another.

* * * * *